United States Patent
Fischer et al.

(10) Patent No.: US 6,380,315 B1
(45) Date of Patent: Apr. 30, 2002

(54) PROCESS FOR PREPARING POLYMERS IN THE PRESENCE OF TRIAZOLYL RADICALS

(75) Inventors: Michael Fischer, Ludwigshafen; Jürgen Koch, Neuhofen; Wolfgang Paulus, Mainz; Klaus Müllen, Köln; Markus Klapper; Marco Steenbock, both of Mainz; Daniel M. Colombani, Strassbourg, all of (DE)

(73) Assignees: BASF Aktiengesellschaft, Ludwigshafen; Max-Planck Gesellschaft zur Foerderung der Wissenschaften e.V., Munich, both of (DE)

(*) Notice: Subject to any disclaimer, the term of this patent is extended or adjusted under 35 U.S.C. 154(b) by 0 days.

(21) Appl. No.: 09/254,455
(22) PCT Filed: Feb. 5, 1997
(86) PCT No.: PCT/EP97/00510
§ 371 Date: Mar. 10, 1999
§ 102(e) Date: Mar. 10, 1999
(87) PCT Pub. No.: WO98/11143
PCT Pub. Date: Mar. 19, 1998

(30) Foreign Application Priority Data

Sep. 12, 1996 (DE) .......... 196 36 996

(51) Int. Cl.⁷ ............ C08F 4/00; C08F 2/00; C08L 53/00
(52) U.S. Cl. .......... 525/256; 526/204; 526/205; 525/299; 525/318.4; 525/328.5
(58) Field of Search .......... 525/256; 526/204, 526/205

(56) References Cited

U.S. PATENT DOCUMENTS

| | | |
|---|---|---|
| 4,040,922 A | 8/1977 | Wang et al. |
| 5,322,912 A | 6/1994 | Georges ............ 526/204 |

FOREIGN PATENT DOCUMENTS

| | | |
|---|---|---|
| EP | 135 280 | 3/1985 |
| GB | 1 061 120 | 3/1967 |

OTHER PUBLICATIONS

Elseier Sci, Trip vol. 2, No. 2, 2/94; 66–72.
Eur. Pol. Jl., vol. 25, No. 7/8, 1989, 643–650.
J. Macromol. Sci. Chem. A14(8), 1231–1241 (1980).
Trip vol. 4, No. 6, Jun. 1996, 183–188.

*Primary Examiner*—Christopher Henderson
(74) *Attorney, Agent, or Firm*—Keil & Weinkauf

(57) ABSTRACT

A process for preparing polymers which comprises conducting polymerization in the presence of free radicals of the formula I

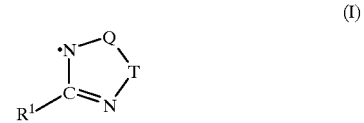

where Q is $NR^2$ or S and T is $CR^3R^4$ or S and $R^1$, $R^2$, $R^3$ and $R^4$ can be identical or different and independently are hydrogen, $C_1$- to $C_{20}$-alkyl or $C_6$- to $C_{18}$-aryl.

11 Claims, No Drawings

PROCESS FOR PREPARING POLYMERS IN THE PRESENCE OF TRIAZOLYL RADICALS

TECHNICAL FIELD

The present invention relates to a process for preparing polymers. The present invention also relates to the use of the polymers obtainable in that process for preparing moldings, films or fibers. Furthermore, the present invention relates to the polymers obtainable by the novel process and to their use.

BACKGROUND ART

Free-radical polymerization is the most widely applicable technique for polymerizing unsaturated monomers such as those containing vinylic double bonds. It permits the polymerization of a large number of monomers varying in structure, functional groups and polarity. The copolymerization of different monomers with one another is also possible. Owing to unavoidable side reactions such as chain transfer, disproportionation, recombination or elimination, however, it is very difficult to control the molecular weight distribution. Normally, polymers having a polydispersity index PDI of 2.0 or more are obtained. The relevant definition is $PDI=M_w/M_n$, $M_w$ being the weight-average and $M_n$ the number-average molecular weight. In addition, little influence can be exerted over the architecture and structure of the polymers.

To prepare polymers with a narrow molecular weight distribution, therefore, the technique of controlled free-radical polymerization was developed, also sometimes called "living" free-radical polymerization, which is described, for example, in M. K. Georges et al., Trends in Polymer Science, Vol. 2, No. 2 (1994), pages 66 to 72. The fundamental strategy of this technique consists in temporarily blocking and then reactivating, in a controlled manner, the reactive free-radical chain ends of a growing polymer chain. The dynamic equilibrium between active and dormant form leads to a low steady-state concentration of free polymer radicals.

A variety of techniques are available for blocking and stabilizing the free-radical chain end. They employ stable free radicals and/or metal salts.

For instance, it is known to use "iniferters", i.e. agents which both free-radically initiate a polymerization and terminate the chain end by combination. Examples of photochemically activated iniferters, such as dithiocarbamates, are described in T. Otsu et al., Eur. Polym. J., Vol. 25, No. 7/8 (1989), pages 643 to 650. However, these photochemical iniferters are very expensive compounds, and photochemically initiated polymerization is highly uneconomic in industrial practice. Furthermore, the polydispersity index is very high in some cases. There are also thermal iniferters, such as tetramethylene disulfides, which are described, for example, in K. Endo et al., Macromolecules, Vol. 25 (1992), pages 5554 to 5556. In this case the PDI, at levels of between 3 and 4, is too high to be satisfactory.

EP-A 135 280 describes the use of stable N-oxyl radicals which combine reversibly with the reactive chain ends. However, this process produces not high molecular mass polymers but oligomers instead.

U.S. Pat. No. 5,322,912 discloses cyclic, sterically shielded N-oxyl radicals which are used in combination with conventional initiators. However, these systems do not permit the polymerization of alkyl acrylates.

A particular group of initiators for controlled free-radical polymerization is formed by compounds which can be cleaved into free-radical initiators and N-oxyl radicals (Trends in Polymer Science, 4(6), 1996, 183–188). These compounds make it possible, for example, to construct branched polymers. However, only selected monomers can be polymerized, and the reaction temperatures are too high to be satisfactory.

In general, the reaction rates for the polymerization of monomers in the presence of N-oxyl radicals are too low for many industrial purposes. For this reason use has been made, for instance, of strong organic acids (U.S. Pat. No. 5,322,912). These acids can give rise to difficulties during the workup of the products, however.

DE-P 195 16 967.0 describes techniques in which vinylic monomers are polymerized in the presence of common free-radical initiators and of electron donors which stabilize the free radical chain end.

DISCLOSURE OF INVENTION

It is an object of the present invention to provide a novel process for preparing polymers which can be used to polymerize a broad range of unsaturated monomers. It is also intended that the novel process should permit very good control over both the molecular weight distribution and the architecture and structure of the polymers. The intention, furthermore, was to find a process having a sufficiently high reaction rate even at relatively low temperatures.

We have found that these objects are achieved by a process for preparing polymers, in which polymerization is conducted in the presence of free radicals of the formula I

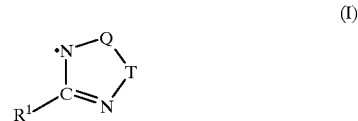

(I)

in which Q is $NR^2$ or S and T is $CR^3R^4$ or S and $R^1$, $R^2$, $R^3$ and $R^4$ can be identical or different and independently are hydrogen, $C_1$ to $C_{20}$-alkyl or $C_6$- to $C_8$-aryl. Reference to the free radicals shown in the formula I should also be understood according to the invention as referring to their tautomers and positional isomers. The alkyls can be linear, branched or cyclic. They can be either unsubstituted or substituted, for example by one or more halogens such as chlorine, nitrile groups, $NO_2$, sulfonic acid radicals, hydroxyls, alkyl or aryl ester radicals. Furthermore, the alkyls may contain sulfoxide or carbonyl radicals. The alkyls include $C_1$ to $C_{12}$-alkyl, preferably $C_1$- to $C_{10}$-alkyl, for example methyl, ethyl, n-propyl, isopropyl, n-butyl, isobutyl, t-butyl, n-pentyl, cyclopentyl, n-hexyl or cyclohexyl. Among these, methyl is particularly preferred. The preferred aryls include phenyl, naphthyl and biphenylyl. The aryls can be either substituted by one or more substituents or else unsubstituted. Suitable substituents are alkyls, for example $C_1$- to $C_{10}$-alkyl, preferably $C_1$- to $C_6$-alkyl, such as methyl, ethyl, n-propyl, isopropyl, n-butyl, isobutyl or t-butyl, or else hydroxyls or halogens such as chlorine. In addition, the aryls can also be substituted by one or more halogens such as chlorine, nitrile groups, $NO_2$, sulfonic acid radicals, alkyl or aryl ester radicals. Among the aryls, phenyl is particularly preferred.

Examples of suitable free radicals I are thiatriazolyls of the formulas

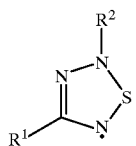
(I₁)

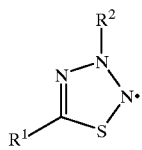
(I₂)

or dithiadiazolyls of the formula

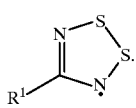
(I₃)

Preference is given to 2,5-dihydro-1H-1,2,4-triazol-2-yl (triazolyl radicals) of the formula

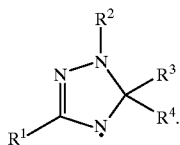
(I₄)

Particular preference is given to free triazolyl radicals in which $R^3$ and $R^4$ are identical. In the very particularly preferred free triazolyl radicals, $R^1$ is phenyl, $R^2$ is phenyl or methyl and $R^3$ and $R^4$ are each phenyl, biphenyl-2,2'-diyl, 6,6'-dimethylbiphenyl-2,2'-diyl or 5,5'-dimethylbiphenyl-2,2'-diyl.

2,5-Dihydro-1H-1,2,4-triazol-2-yl radicals are known per se or are obtainable by methods known per se. Thus the free triazolyl radicals can be obtained, for example, by irradiating 1H-1,2,4-triazoles with γ radiation or can be prepared by dehydrogenating 4,5-dihydro-1H-1,2,4-triazoles with basic potassium hexacyanoferrate solution. Another method of obtaining free triazolyl radicals is the ring contraction of tetrazines in the presence of acids (Tetrahedron, 51 (47), 1995, 12883–12898).

Thiatriazolyls can be prepared, for example, by reducing the corresponding thiatriazol-1-ium salts (J. Am. Chem. Soc. Perkin Trans 2 (1990) 1619). Dithiadiazolyls are obtainable, for example, by reducing the corresponding dithiadiazolium salts (Chem. Ber. 118 (1985) 3781).

The free radicals I can be generated in situ by, for example, one of the abovementioned methods. The free radicals I are preferably prepared separately, isolated, and employed as they are. In addition, the free radicals I can be employed in the novel process alternatively in the form of compounds II which can be cleaved into free-radical initiators and free radicals I. Compounds of this kind can be summarized, for example, by the formula II

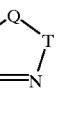
(II)

where $R^5$ is a radical which, when eliminated, is able to initiate a free-radical reaction. Preferred compounds II contain as $R^5$ an alkyl, preferably $C_1$- to $C_{10}$-alkyl, which can either be linear or branched and can be substituted by one or more substituents, especially halogens such as chlorine or nitrile groups. The alkyls can also be interrupted by one or more heteroatoms such as oxygen. $R^5$ can also be an aryl or substituted aryl, preferably a $C_6$- to $C_{18}$-aryl. Preferred radicals $R^5$ are formed from the decomposition of customary free-radical initiators such as azobisisobutyronitrile or benzoyl peroxide.

The compounds II can be prepared, for example, by reacting a source of free radicals, such as dibenzoyl peroxide or azoisobutyronitrile, with a free radical I. In this reaction, the free-radical source can be cleaved into the decomposition residues by methods known per se, examples being thermal, photochemical or redox methods.

The compounds II can be cleaved, for example, by thermal or photochemical methods. In addition, they can be cleaved by redox methods. In general, the compounds II are cleaved thermally. They generally undergo cleavage at from 0 to 300° C., preferably from 50 to 150° C.

The novel process can be performed using a free radical I and/or a compound II. It is likewise possible to employ different free radicals I and/or compounds II. Yet another possibility is to use mixtures of free radicals I and compounds II.

Using the novel process, a wide variety of unsaturated monomers, especially vinyl monomers, can be polymerized. Particularly suitable vinylic monomers are vinyl-aromatic compounds such as styrene, 2-vinylnaphthalene and 9-vinylanthracene, substituted vinyl-aromatic compounds such as p-methylstyrene, α-methylstyrene, p-chlorostyrene, 2,4-dimethylstyrene and 4-vinylbiphenyl, $C_1$- to $C_8$-alkyl esters of acrylic or methacrylic acid, especially $C_1$ to $C_4$ acrylates and $C_1$ to $C_4$ methacrylates, unsaturated dicarboxylic acids, for example aliphatic unsaturated dicarboxylic acids such as maleic and fumaric acid, or derivatives thereof such as anhydrides, esters and amides, especially anhydrides such as maleic anhydride, or vinyl cyanides, especially acrylonitrile. Mixtures of different monomers can likewise be employed.

Preferred monomers are styrene, substituted styrenes, $C_1$ to $C_4$ acrylates and $C_1$ to $C_4$ methacrylates, especially methyl methacrylate, and acrylonitrile.

Unless employed in the form of a compound II, the free radicals I are generally incapable of initiating a polymerization reaction. It is therefore possible in one of the preferred embodiments to use free-radical initiators as well. The free-radical initiators are known per se and are described, for example, in Ullmanns Encyclopädie der technischen Chemie, 4th edition, Volume 15, page 187. Particularly suitable are peroxides, such as dibenzoyl peroxide and cumene hydroperoxide, and especially diazo compounds, such as azodiisobutyronitrile (AIBN). It is also possible to employ mixtures of different free-radical initiators.

The molar amount of free-radical initiator can be from $10^{-6}$ to 1 mol/l, preferably from $10^{-4}$ to $10^{-1}$ mol/l, based on the volume of the monomers employed. The molar ratio of free-radical initiator to free-radical I is generally from 1:0.5 to 1:10, preferably from 1:0.5 to 1:5 and, in particular, from 1:0.5 to 1:2.5.

In a further preferred embodiment it is possible to use electron donors as are described, for example, in DE-P 195 16 967.0. Preferred electron donors are phenothiazine derivatives or phenoselenazines of the formula

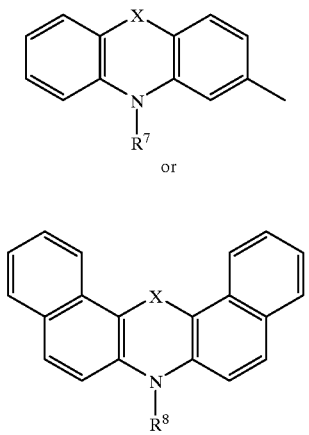

where

X is oxygen, sulfur or selenium, preferably sulfur, and $R^6$ is hydrogen, —$C_1$- to $C_5$-alkyl, preferably methyl or ethyl, —$CF_3$, halogen, preferably —Cl, —CN, alkyl sulfide, preferably $C_1$- to $C_{10}$-alkyl sulfide, aryl sulfide, preferably phenyl sulfide, alkoxy, preferably $C_1$- to $C_{10}$-alkoxy, aryloxy, preferably phenoxy, alkylamine, preferably $C_1$- to $C_{10}$-alkylamine, dialkylamine, preferably di-$C_1$- to $C_{10}$-alkylamine, arylamine, preferably phenylamine, or diarylamine, preferably diphenylamine, $R^7$ is hydrogen or —(Z—)$Z^1$, $z^1$ is an unbranched or branched $C_1$- to $C_{25}$-alkylene group, preferably a $C_1$- to $C_{25}$-alkylene group, particularly preferably a $C_1$- to $C_{10}$-alkylene group, for example methylene, ethylene, 2-methylethylene, n-propylene or n-butylene, $Z^1$ is —OH, alkoxy, preferably $C_1$- to $C_{10}$-alkoxy, aryloxy, preferably phenoxy, alkyl sulfide, preferably $C_1$- to $C_{10}$-alkyl sulfide, aryl sulfide, preferably phenyl sulfide, —$NH_2$, alkylamine, preferably $C_1$- to $C_{10}$-alkylamine, dialkylamine, preferably di-$C_1$- to $C_{10}$-alkylamine, arylamine, preferably phenylamine, diarylamine, preferably diphenylamine or $Z^2$, preference being given to $Z^2$, —$NH_2$, alkylamine or dialkylamine, $Z^2$ is a $C_4$- to $C_7$-cycloaliphatic radical, preferably a $C_5$- or $C_6$-cycloaliphatic ring which can contain one or more —O—, —S— or —N(alkyl) groups, preferably —N($C_1$- to $C_{10}$-alkylamine), the latter group being preferred, and $Z^2$ is in each case linked via a carbon to Z, and the groups —O—, —S— and —N(alkyl)— are not attached to one another directly.

The preferred phenothiazines include:

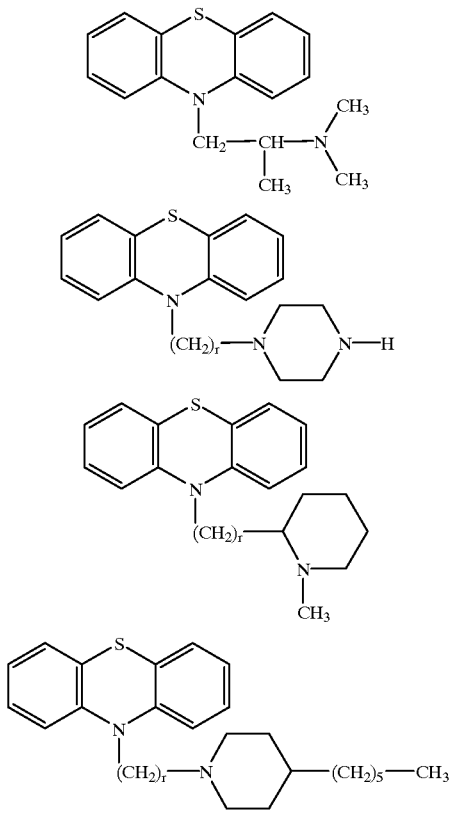

in each of which r is an integer from 2 to 11 and s is an integer from 1 to 4.

It is also possible to employ mixtures of different electron donors.

The compounds employed as electron donors are known per se or can be prepared by methods known per se and are described, for example, in J. H. Perlstein, Angew. Chem. Int. Ed. Engl. 16 (1977), pages 519 to 534 and M. R. Bryce, Aldrichimica Acta, Vol. 18 (1985), pages 73 to 77.

The molar ratio of electron donors to free radicals I can be in the range from 0.1:1 to 10:1, preferably from 0.5:1 to 2:1.

The molar ratio of electron donors to free-radical initiators can be in the range from 1:1 to 3:1, preferably from 1.6:1 to 2.4:1.

The novel process can also be carried out in the presence of mixtures of the free radicals I and N-oxyl radicals. It is also conceivable to conduct the novel process in the presence of mixtures of free radicals I, electron donors and N-oxyl radicals. In that case the N-oxyl radicals serve as moderators, ie. they slow down the reaction rate, apparently by displacing some of the free radicals I from the chain end.

As already mentioned, N-oxyl radicals are known per se or can be prepared by methods known per se. In the invention it is possible to use N-oxyl radicals with a wide variety of structures, including both acyclic and cyclic examples. Preference is generally given to cyclic N-oxyl radicals of the formula IV:

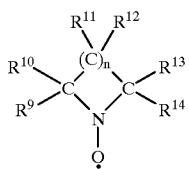
(IV)

where $R^9$ to $R^{14}$ can be identical or different and independently are hydrogen, $C_1$- to $C_{20}$-alkyl, $C_6$- to $C_{18}$-aryl, —OH, —SH, —NH$_2$, alkylamine or dialkylamine. The variable n is an integer from 1 to 5, preferably 2 or 3. Among the alkyls preference is given to $C_1$- to $C_{10}$-alkyl, especially $C_1$- to $C_5$-alkyl, and among the aryls to phenyl. The radicals $R^9$ and $R^{10}$ and also $R^{13}$ and $R^{14}$ are each preferably phenyl or alkyl or a phenyl and an alkyl such as methyl or ethyl. $R^{11}$ and $R^{12}$ are preferably hydrogen. If n is greater than 1, the $CR^{11}R^{12}$ groups may each be identical. However, it is also possible for different $CR^{11}R^{12}$ groups to be present. Where there is more than one $CR^{11}R^{12}$ group, the radicals in one of these groups is preferably OH and hydrogen.

Preference is given to 2,2,6,6-tetramethyl-1-piperidinyloxy (TEMPO), 4-oxo-2,2,6,6-tetramethyl-1-piperidinyloxy (4-oxo-TEMPO), 4-hydroxy-2,2,6,6-tetramethyl-1-piperidinyloxy, 2,2,5,5-tetramethyl-1-pyrrolidinyloxy, 3-carboxy-2,2,5,5-tetramethyl-pyrrolidinyloxy and di-tert-butyl nitroxide. 2,6-Di-phenyl-2,6-dimethyl-1-piperidinyloxy and 2,5-diphenyl-2,5-dimethyl-1-pyrrolidinyloxy can likewise be employed. Mixtures of different N-oxyl radicals can also be employed.

The molar ratio of N-oxyl radical to free radical I is preferably in the range from 0.1:1 to 20:1, preferably in the range from 0.1:1 to 10:1, particularly preferably in the range from 0.1:1 to 2:1.

The molar ratio of N-oxyl radical to free-radical initiator is preferably in the range from 0.5:1 to 5:1, in particular from 0.8:1 to 4:1, and particularly preferably in the range from 1:1 to 1.5:1.

The novel polymerization can be performed by a variety of different methods such as bulk, solution, emulsion or suspension polymerization. For example, polymerization can be carried out in the melt, for instance in an extruder or compounder. Examples of suitable solvents for polymerization in solution are tetrahydrofuran, toluene, ethylbenzene or mixtures thereof.

The conditions for the reaction are in general not critical; it can be carried out at from 0 to 220° C., preferably from 20 to 180° C., normally under atmospheric pressure, although it is also possible to operate at pressures up to 30 bar. The chosen reaction times are preferably such that polymerization is carried out until the desired molecular weight is reached, for example for from 1 hour to 6 days.

It can be advantageous to conduct the reaction under inert gas, for example nitrogen or a noble gas such as argon.

The novel process is preferably conducted by charging the freeradical initiator and the free radical I or a compound II to the reactor and adding the monomer or monomers and, if used, the solvent. However, it is also possible to reverse the addition sequence. Where electron donors or N-oxyl radicals or mixtures thereof are used, they can be included in the initial charge together with the free-radical initiators and the free radical I. Alternatively, they can be added separately or individually in the course of the polymerization reaction. The polymers can be worked up by precipitation, for example in methanol or hexane.

The number-average molecular weights $M_n$ of the resulting polymers can vary within wide ranges, for example from 5000 to 500,000 g/mol.

MODE(S) FOR CARRYING OUT THE INVENTION

By means of the novel process it is possible to prepare not only homopolymers or random copolymers but also segmented copolymers such as block copolymers, star block copolymers, graft copolymers or graft block copolymers, by reacting the polymers further, preferably without workup, with other monomers or monomer mixtures having a different composition. In this case it may be necessary to add further amounts of free radicals I or compounds II, free-radical initiators, electron donors or N-oxyl radicals, or mixtures thereof.

For example, block copolymers can be prepared by the novel process by reacting

A) monomers selected from the group consisting of styrene, α-methylstyrene, acrylonitrile, methacrylonitrile, methyl methacrylate and maleic anhydride to form blocks A having a glass transition temperature $T_g$ of greater than 0° C.

and

B) monomers selected from the group consisting of n-butyl acrylate, methyl acrylate and 2-ethylhexyl acrylate to form blocks B having a glass transition temperature $T_g$ of less than 0° C.

The monomers A) are preferably employed in an amount of from 10 to 90% by weight, in particular from 20 to 80% by weight.

It is also possible to employ different monomers A).

The monomers employed as B) are those which form blocks B having a glass transition temperature of less than 0° C. and are selected from the group consisting of n-butyl acrylate, methyl acrylate and 2-ethylhexyl acrylate, preferably n-butyl acrylate.

The monomers B) are preferably employed in an amount of from 10 to 90% by weight, in particular from 20 to 80% by weight, and the sum of the amounts of the monomers A) and B) is 100% by weight.

Particularly preferred block copolymers are those composed of styrene or acrylonitrile or mixtures thereof and also n-butyl acrylate or of methyl methacrylate and also n-butyl acrylate.

It is also possible to employ different monomers B).

The monomers A) constitute a block A, the monomers B) a block B; the block copolymers can be diblock copolymers or else triblock copolymers, are preferably noncrosslinked and can have a structure which is linear, for example A-B, A-B-A, B-A-B or (A-B)$_n$, star-shaped, for example A(B)$_n$, B(A)$_n$ or (A)$_n$-B-A-(B)$_m$, dendrimeric, for example ((A)$_n$-B)$_m$A, ((B)$_n$-A)$^M$B, ((A)$_m$-B)$_n$(A)$_p$B or ((B)$_m$-A)$_n$(B)$_p$A, or comb-shaped, for example ((A)$_n$-A(B))$_q$ or ((B)$_n$-B(A))$_q$, m, n and p being integers from 1 to 5 and q being an integer from 0 to 1000.

Each of the blocks A and B preferably has a molecular weight $M_w$ (weight average) in the range from 1000 to 250,000, and the blocks A and B are incompatible with one another.

The block copolymers preferably have a molecular weight distribution (polydispersity) $M_w/M_n$ ($M_n$=number average) of less than 3, in particular less than 2. The individual blocks A and B likewise preferably have a polydispersity $M_w/M_n$ of less than 3, in particular less than 2.

Particularly suitable polymers are triblock polymers of the type A-B-A or B-A-B comprising a mixture of from 65 to 85% by weight, preferably from 70 to 80% by weight, of styrene and from 15 to 35% by weight, preferably from 20 to 30% by weight, of acrylonitrile as monomer A and from 50 to 100% by weight, preferably from 70 to 100% by weight, of n-butyl acrylate and from 0 to 50% by weight, preferably from 0 to 30% by weight, of one or more monomers from the group consisting of acrylonitrile, olefinic dienes such as butadiene, a, β-unsaturated carboxylic acids such as acrylic acid or methacrylic acid, and also esters of such carboxylic acids, especially with $C_1$–$C_{10}$-alkanols, as monomer B, the molecular weight $M_w$ of the blocks A and B, independently of one another, each being from 5000 to 10,000, preferably from 30,000 to 70,000, such as triblock polymers of the type B-A-B comprising a mixture of 75% by weight of styrene and 25% by weight of acrylonitrile as monomer A and n-butyl acrylate as monomer B, the molecular weight $M_w$ of the blocks A and B being 50,000 in each case.

At the chain end of the novel block copolymers there is generally a radical derived from the free radicals I or $R^5$. In some cases these radicals may be exchanged for a terminal oxyamine group.

The block copolymers are preferably prepared at from 100 to 160° C., preferably from 130 to 160° C.

The block copolymers may also include from 0 to 50% by weight, based on the sum of the percentages by weight of A) and B), of fibrous or particulate additives.

These can, for example, be glass fibers, flameproofing agents, stabilizers and antioxidants, heat stabilizers or UV stabilizers, lubricants and mold release agents, dyes and pigments or plasticizers.

Fibers of E, A or C glass can be used. The glass fibers are usually treated with a size and an adhesion promoter. The diameter of the glass fibers is generally from 6 to 20 μm. It is possible to incorporate both continuous fibers (rovings) and chopped strands with a length of from 1 to 10 mm, preferably from 3 to 6 mm.

Pigments and dyes are generally present in amounts of up to 6% by weight, preferably from 0.5 to 5% by weight and, in particular, from 0.5 to 3% by weight, based on the monomers A) and B).

The pigments for coloring thermoplastics are generally known: see, for example, R. Gächter and H. Müller, Taschenbuch der Kunststoffadditive, Carl Hanser Verlag, 1983, pp. 494 to 510. A first preferred group of pigments is that of white pigments such as zinc oxide, zinc sulfide, lead white ($2PbCO_3Pb(OH)_2$), lithopones, antimony white and titanium dioxide.

Black pigments which can be employed are iron oxide black ($Fe_3O_4$), spinel black ($Cu(Cr,Fe)_2 O_4$), manganese black (mixture of manganese dioxide, silica and iron oxide), cobalt black and antimony black, and also, with particular preference, carbon black, which is usually employed in the form of furnace black or gas black (in this context see G. Benzing, Pigmente für Anstrichmittel, Expert-Verlag (1988), p. 78 ff).

In order to establish specific shades it is of course possible to employ inorganic pigments such as chromium oxide green or organic pigments such as azo pigments or phthalocyanines. Pigments of this kind are generally common commercial products.

Antioxidants and heat stabilizers which can be added to the block copolymers are, for example, halides of metals from group I of the Periodic Table, for example sodium, potassium and lithium halides, alone or in conjunction with copper(I) halides, for example the chlorides, bromides or iodides. The halides, especially those of copper, may also carry electron-rich p ligands. Examples of copper complexes of this kind which may be mentioned are Cu halide complexes with, for example, triphenylphosphine. Zinc fluoride or zinc chloride may also be used. Other compounds which may be employed are sterically hindered phenols, hydroquinones, substituted representatives of this group, secondary aromatic amines, alone or in conjunction with phosphorus-containing acids or their salts, and mixtures of these compounds, preferably in concentrations of up to 1% by weight, based on the monomers A) and B).

Examples of UV stabilizers are various substituted resorcinols, salicylates, benzotriazoles and benzophenones, which are generally employed in amounts of up to 2% by weight based on the monomers A) and B).

Lubricants and mold release agents, which are generally added in amounts of up to 1% by weight to the block copolymers, are stearic acid, stearyl alcohol, alkyl stearates and stearamides, and also esters of pentaerythritol with long-chain fatty acids. It is also possible to employ salts of calcium, of zinc or of aluminum with stearic acid and also dialkyl ketones, for example distearyl ketone.

Examples of plasticizers are dialkyl phthalates or else polymeric plasticizers, which must be homogeneously miscible with at least one of the monomers A) and B). The plasticizers can be added to the mixtures in amounts of up to 50% by weight, based on the monomers A) and B).

The mixtures of the block copolymers with the additives can be prepared by methods known per se, by mixing the components in customary mixing apparatus such as screw extruders, Brabender mills or Banbury mills and then extruding the mixtures. After extrusion, the extrudate is cooled and comminuted.

These block copolymers obtainable by the novel process are notable for high impact strengths, especially at low temperatures. At the same time they have high weathering and aging stability. Moreover, they lend themselves well to coloring and are also notable for a degree of transparency/translucency which leads to excellent colorability properties. In addition, they are suitable as impact modifiers in thermoplastic molding compositions.

They can be processed into moldings or films. They can also be applied, for example by means of known coextrusion techniques, in the form of layers (preferably in layer thicknesses of from 100 μm to 100 mm) to surfaces, preferably to thermoplastics such as styrene-acrylonitrile copolymers, acrylonitrile-butadiene-styrene terpolymers (ABS), ASA plastics, polystyrene, impact-modified polystyrene (HIPS), impact-modified polymethyl methacrylate or PVC. Also possible are mixtures of the block copolymers with thermoplastics such as styrene-acrylonitrile copolymers, polymethyl methacrylate, polystyrene, polycarbonate, polyphenylene ethers, polyamide, impact-modified polystyrene, acrylonitrile-butadiene-styrene copolymers (ABS), acrylonitrile-styrene-acrylate copolymers (ASA) or mixtures thereof, by means of known injection-molding and extrusion techniques. They can be employed, for instance, in the automotive sector, in the domestic field and for leisure articles. Thus they can be processed, for example, into automotive components, road signs, window profiles, lamp covers, garden furniture, boats, surfboards or toys. The films are suitable for the packaging sector and feature good resilience.

In addition to the abovementioned block copolymers it is also possible to use the novel process to prepare block copolymers which can be used as dispersants. Block copolymers of this kind are, in accordance with the invention, amphiphilic block copolymers and also those which can be converted by selective hydrolysis into such amphiphilic block copolymers. According to the invention, these amphiphilic block copolymers consist of at least one polymer block of type C obtainable by polymerization, in the presence of free radicals I, of one or more hydrophobic monomers from the group C embracing styrene, methyl methacrylate, n-butyl acrylate, n-dodecyl acrylate, 2-ethylhexyl acrylate, dihydrodicyclopentadienyl acrylate and vinyl dodecyl ether and at least one polymer block of type D obtainable by polymerization, in the presence of free radicals I, of one or more hydrophilic monomers, or monomers which can be hydrolyzed to hydrophilic monomers, from group D embracing acrylic acid, methacrylic acid, 2-acrylamido-2-methylpropanesulfonic acid, styrenesulfonic acid, the potassium, sodium and ammonium salts of these acids, methyl acrylate, t-butyl acrylate, t-butyl methacrylate, $\omega$-hydroxy-$C_2$- to $C_4$-alkyl acrylate, $\omega$-hydroxy-$C_2$- to $C_4$-alkyl methacrylate, vinylpyrrolidone, vinylimidazole, vinylcaprolactam, vinylformamide, N-methylvinylimidazole, vinyl methyl ether and dimethylaminoethyl acrylate, the polymer blocks of types C and D being connected to one another directly and not via constituent units which are not part of the blocks.

The novel amphiphilic block copolymers (the term block copolymer here denotes polymers whose molecules consist of—preferably linearly—linked blocks connected directly to one another, a block being a section of a polymer molecule comprising a plurality of monomer units possessing at least one common feature not present in the directly adjacent sections) can be diblock copolymers, triblock copolymers or even multiblock copolymers comprising more than three blocks. They are preferably not crosslinked.

If a polymer block of type C is labeled C and a polymer block of type D is labeled D, and leaving aside residues of initiator and any moderator and fragmentation residues, then examples of suitable novel amphiphilic block copolymers are linear systems such as C-D, C-D-C, D-C-C or $(C-D)_n$, star-shaped systems such as $C(D)_n$, $D(C)_n$ or $(C)_n$-D-C-(D)$_m$, dendrimeric systems such as $((C)_n$-D)$_m$C, $((D)_n$-C)$_m$D, $((C)_m$-D)$_n(C)_p$D or $((D)_m$-C)$_n(D)_p$C or comb-shaped systems such as $((C)_n$-C(D))$_q$ or $((D)_n$-D(C))$_q$, m, n and p being integers from 1 to 5 and q being an integer from 0 to 1000.

Preferably, blocks C and D (independently) have a degree of polymerization of from 10 to 50, frequently from 10 to 40, often from 10 to 30 or from 10 to 20.

Furthermore, in accordance with the invention, linear diblock and triblock copolymers are preferred. If the sequence of the letters C and D represents the chronological sequence of block preparation, then amphiphilic block copolymers which are advantageous according to the invention can be schematically represented as C-D, D-C, D-C-D and D'-C-D.

In very general terms the polymer blocks C, D and D' are frequently homopolymers. In many cases, all the polymer blocks of the novel amphiphilic block copolymers consist of homopolymers. Again very generally, the degrees of polymerization of hydrophilic and hydrophobic polymer blocks can be harmonized with one another in preliminary experiments in such a way that the amphiphilic block copolymer to be used, in the amount to be employed, is soluble in the aqueous polymerization medium in the manner required by the invention (in general the solubility in water at 20° C. and 1 atm is at least 0.1% by weight). Such novel amphiphilic block copolymers soluble in the aqueous medium should also be taken to include those which, although not soluble directly in the aqueous polymerization medium, can be made to dissolve indirectly, for example by first of all dissolving them in a water-miscible organic solvent or in a mixture of water and such an organic solvent (for example in dioxane, tetrahydrofuran or mixtures thereof with water), and this solution (which according to the invention can in some cases even be added directly to the aqueous polymerization medium) is then converted, for example by dialysis or multiple addition of small amounts of water followed by distillative removal of the organic solvent used, into an aqueous solution (instead of water, an aqueous solution of an acid and/or base is also frequently employed). The term solution here does not necessarily imply a molecular solution but merely expresses the fact that the liquid is clear, and in particular also embraces micellar solutions, especially those not in thermodynamic equilibrium.

If the basic unit of a homopolymeric polymer block is put in square brackets and a subscript number is appended outside the square bracket to indicate the number of times the basic unit repeats itself in the respective block, and if the sequence of items in the square brackets reproduces the sequence of the preparation of the blocks without taking into account residues of initiator and any moderator and fragmentation residues, then examples of the novel amphiphilic block copolymers include

[styrene]$_a$[t-butyl acrylate]$_b$
[t-butyl acrylate]$_b$[styrene]$_a$
[styrene]$_a$[t-butyl methacrylate]$_{b'}$
[t-butyl methacrylate]$_{b'}$[styrene]$_{a'}$
[styrene]$_a^{2'}$[acrylic acid]$_b^{2'}$
[acrylic acid]$_b^{2'}$[styrene]$_a^{2'}$
[styrene]$_a^{3'}$[Na acrylate]$_b^{3'}$
[Na acrylate]$_b^{3'}$[styrene]$_a^{3'}$
[styrene]$_{a*}$[methacrylic acid]$_{b*}$
[methacrylic acid]$_{b*}$[styrene]$_{a*}$
[styrene]$_a^{2*}$[Na methacrylate]$_b^{2*}$
[Na methacrylate]$_b^{2*}$[styrene]$_a^{2*}$
[styrene]$_a^{3*}$[Na styrenesulfonate]$_b^{3*}$
[Na styrenesulfonate]$_b^{3*}$[styrene]$_a^{3*}$
[styrene]$_a$+[Na 2-acrylamido-2-methylpropanesulfonate]$_b$+
[Na 2-acrylamido-2-methylpropanesulfonate]$_b$+[styrene]$_a$+
[acrylic acid]$_a^{2+}$[methyl methacrylate]$_b^{2+}$
[styrene]$_a^{3+}$[vinylpyrrolidone]$_b^{3+}$
[vinylpyrrolidone]$_b^{a+}$[styrene]$_a^{3+}$
[styrene]$_a^{4+}$[vinylcaprolactone]$_b^{4+}$
[vinylcaprolactone]$_b^{4+}$[styrene]$_a^{4+}$
[methyl methacrylate]$_a^{5+}$[vinylcaprolactone]$_b^{5+}$
[vinylcaprolactone]$_b^{5+}$[methyl methacrylate]$_a^{5+}$
[styrene]$_a^{6+}$[vinylimidazole]$_b^{6+}$
[vinylimidazole]$_b^{6+}$[styrene]$_a^{6+}$
[styrene]$_a^{7+}$[methylvinylimidazole]$_b^{7+}$
[methylvinylimidazole]$_b^{7+}$[styrene]$_a^{7+}$
[ethylhexylacrylate]$_a^{8+}$[methylvinylimidazole]$_b^{8+}$
[methylvinylimidazole]$_b^{8+}$[ethylhexyl acrylate]$_a^{8+}$
[styrene]$_a^{9+}$[hydroxyethyl acrylate]$_b^{9+}$
[hydroxyethyl acrylate]$_b^{9+}$[styrene]$_a^{9+}$
[styrene]$_a^{4*}$[hydroxymethyl acrylate]$_b^{4*}$

[hydroxymethyl acrylate]$_b^{4*}$[styrene]$_a^{4*}$
[styrene]$_a^{5*}$[hydroxypropyl acrylate]$_b^{5*}$
[hydroxypropyl acrylate]$_b^{5*}$[styrene]$_a^{5*}$
[styrene]$_a^{6*}$[hydroxymethyl acrylate]$_b^{6*}$
[hydroxymethyl acrylate]$_b^{6*}$[styrene]$_a^{6*}$
[styrene]$_a^{7*}$[hydroxybutyl acrylate]$_b^{7*}$
[hydroxybutyl acrylate]$_b^{7*}$[styrene]$_a^{7*}$
[styrene]$_a^{8*}$[N-vinylformamide]$_b^{8*}$
[N-vinylformamide]$_b^{8*}$[styrene]$_a^{8*}$
[styrene]$_a^{9*}$[dimethylaminoethyl acrylate]$_b^{9*}$
[dimethylaminoethyl acrylate]$_b^{9*}$[styrene]$_a^{9*}$
[styrene]$_a^{4'}$[vinyl methyl ether]$_b^{4'}$
[vinyl methyl ether]$_b^{4'}$[styrene]$_a^{4'}$
[styrene]$_a^{5'}$[methyl acrylate]$_a^{5'}$
[methyl acrylate]$_a^{5'}$[styrene]$_a^{5'}$ where a, a' to a$^{5'}$, a* to a$^{9*}$ and a$^+$ to a$^{9+}$=10 to 50, or 10 to 40, or 10 to 30, or 10 to 20, b, b' to b$^{5'}$, b* to b$^{9*}$ and b$^+$ to b$^{9+}$=at least 50%, or at least 75% or ≧100% of the respective associated coefficients a, a' to a$^{5'}$, a* to a$^{9*}$ and a$^+$ to a$^{9+}$ (the coefficients a etc. are preferably 35 to 45 and the coefficients b etc. are likewise preferably 35 to 45). If the molecular weight of the novel amphiphilic block copolymers is nonuniform, then the coefficents a, a' to a$^{5'}$, a* to a$^{9*}$ and b, b' to b$^{9'}$, b* to b$^{9*}$ and b$^+$ to b$^{9+}$ mean the number-average values. The abovementioned block copolymers also constitute novel amphiphilic block copolymers if styrene is replaced wholly or partially by methyl methacrylate, n-butyl acrylate and/or 2-ethylhexyl acrylate, in which case examples of advantageous amphiphilic block polymers include

[methyl methacrylate]$_a^x$[t-butyl acrylate]$_b^x$
[t-butyl acrylate]$_b^x$[methyl methacrylate]$_a^x$ where a=30 to 50, preferably 35 to 45, such as 36, 37, 38, 39 or 40, and b$^x$=30 to 50, preferably 35 to 45, such as 36, 37, 38, 39 or 40, and, in particular, a$^x$ and b$^x$=38.

Furthermore, triblock copolymers D-C-D composed of the polymer blocks C and D present in the abovementioned diblock copolymers also form novel amphiphilic block copolymers.

The novel amphiphilic block copolymers generally have a radical at the chain end that is derived from the free radicals I or from R$^5$. In some cases, these radicals can be exchanged for a terminal oxyamine group. For various reasons it may be desirable to remove the radicals derived from the free radicals I. In column 6, lines 54 et seq., U.S. Pat. No. 4,581,429 offers various possibilities for such removal. Of particular interest in the context of the invention are those which lead to an —H, a hydroxyl or an ethylenically unsaturated terminal group. In the latter case it is possible to obtain ethylenically unsaturated amphiphilic block copolymers (macromers), which are of interest in so far as, in the course of a free-radical aqueous emulsion polymerization, they are bonded chemically to the dispersed polymer particles, thereby completely ruling out their migration following the formation of a film. Generally, amphiphilic block copolymers to be used are preferably prepared such that the hydrophobic block is terminated by a possibly hydrophobic initiator residue or moderator residue. Of course the hydrophilic block can also be terminated in this way.

A free-radical aqueous emulsion polymerization using the novel amphiphilic block copolymers can be conducted, simply, by taking a preferably micellar aqueous solution of the amphiphilic block copolymer that is to be used and mixing it with further aqueous dispersion medium if appropriate, with the monomers to be polymerized, and with the free-radical polymerization initiator in a polymerization vessel, heating the mixture with stirring to the polymerization temperature, and maintaining polymerization with stirring until the desired degree of polymerization has been reached.

The polymerization temperature, which is adapted to the nature of the dispersion medium and to the initiator system used, is normally from 20 to 100° C. It is often from 50 to 95° C. and frequently from 70 to 90° C.

The free-radical aqueous emulsion polymerization normally takes place under atmospheric pressure (1 atm). However, and especially when using monomers which are gaseous at atmospheric pressure, it can also be carried out under superatmospheric pressure. Similarly, polymerization at above 100° C. is also possible (for example at up to 130° C.). The conditions just mentioned are also typical of the other free-radical aqueous emulsion polymerization techniques dealt with in this document. In the case of the emulsion polymerization technique described, where all of the polymerization mixture is placed to start with in the polymerization vessel, the size of the polymer particles which form is determined essentially by the nature and amount of the amphiphilic block copolymer present in the mixture. As the amount of novel block copolymer present in the mixture increases, the polymer particles obtained become smaller, and vice versa.

However, a disadvantage of the described emulsion polymerization technique (where the whole mixture is included in the initial charge) is that it is only suitable for preparing aqueous polymer dispersions having a relatively low polymer content.

With the polymer contents encountered in practice (generally >25% by weight) there are problems with the whole-mixture initial charge technique, for example with regard to the technical ability to dissipate the heat produced by the exothermic polymerization reaction.

On the industrial scale, therefore, the free-radical aqueous emulsion polymerization is generally carried out by the feed technique, where the predominant amount (generally 50–100% by weight) of the monomers to be polymerized is added to the polymerization vessel in accordance with the progress of polymerization of the monomers already present in this vessel (degree of polymerization of in general ≧80, or ≧90 or ≧95 mol-%). For controlled adjustment of the particle size of the resulting aqueous polymer dispersion, the feed technique involves initially charging to the polymerization vessel, in accordance with the invention, normally a micellar aqueous solution of the amphiphilic block copolymer to be added. The ratio of initially charged micelles (and their nature) to monomers to be polymerized essentially determines the size of the polymer particles in the resulting aqueous polymer dispersion. The smaller the initially charged micelles and the greater their number, the smaller the resulting polymer particles, for a given amount of monomer. If the number of micelles initially charged is multiplied, then as a rule the number of polymer particles formed in the novel procedure is increased. In the feed technique, it is preferable for not more than 20% by weight of the monomers which are to be polymerized to be charged initially to the polymerization vessel. Following the beginning of the free-radical aqueous emulsion polymerization, the remaining monomers are fed in over the course of the novel feed process such that at any point in time during their addition the degree of polymerization of the total monomers already supplied to the polymerization vessel is at least 80 mol-%, preferably at least 90 mol-%.

The way in which the free-radical initiator system is added to the polymerization vessel in the course of the free-radical aqueous emulsion polymerization with the feed technique is of fairly minor importance. The initiator system can either be included in its totality in the initial polymerization vessel charge or else added, continuously or in stages, in proportion with its consumption in the course of the novel feed technique. In each individual case the skilled worker will be aware that this depends both on the chemical nature of the initiator system and on the polymerization temperature.

In the context of the feed technique it is of course possible to add some of the novel amphiphilic block copolymers to the polymerization vessel along with the monomer feed as well, or only during the monomer feed (in other words, the initial charge does not include the total amount of the novel amphiphilic block copolymers). Here too, the amphiphilic block copolymers to be added are preferably supplied in the form of a ready-prepared micellar aqueous solution.

Suitable free-radical polymerization initiators for the free-radical aqueous emulsion polymerization technique are all those capable of initiating a free-radical aqueous emulsion polymerization. They may be peroxides, for example alkali metal peroxodisulfates, or azo compounds. For low-temperature polymerizations it is preferred to employ combined systems, composed of at least one organic reducing agent and at least one peroxide and/or hydroperoxide, for example tert-butyl hydroperoxide and the sodium metal salt of hydroxymethanesulfinic acid, or hydrogen peroxide and ascorbic acid (as an electrolyte-free redox initiator system), and it is very particularly preferred to employ combined systems additionally comprising a small amount of the metal compound which is soluble in the polymerization medium and whose metallic component can occur in a plurality of valence states, an example being ascorbic acid/iron(II) sulfate/hydrogen peroxide, where the ascorbic acid is frequently replaced by the sodium metal salt of hydroxymethanesulfinic acid, sodium sulfite, sodium hydrogen sulfite or sodium metal disulfite and the hydrogen peroxide by tert-butyl hydroperoxide or alkali metal peroxodisulfates and/or ammonium peroxodisulfate. A combination of water-soluble Fe/V salts is often used instead of a water-soluble iron(II) salt.

In general, the amount of free-radical initiator system employed, based on the overall amount of the monomers to be polymerized, is from 0.1 to 2% by weight.

It is notable that the free-radical aqueous emulsion polymerization technique in accordance with the invention does not necessarily require the use of additional dispersants in order to obtain an aqueous polymer dispersion of satisfactory stability.

However, it is of course possible in the context of the novel process for emulsion polymerization to use conventional dispersants as well in order to achieve further stabilization or modification of the disperse distribution of the polymer particles produced.

Examples of such conventional dispersants are the customary surfactants, for example Dowfax®2 A1 from Dow Chemical Company, ethoxylated mono-, di- and tri-alkylphenols (EO degree: 3 to 50, alkyl: $C_4$ to $C_9$), ethoxylated fatty alcohols (EO degree: 3 to 50, alkyl: $C_8$ to $C_{36}$), and also alkali metal and ammonium salts of alkyl sulfates (alkyl: $C_8$ to $C_{12}$), of sulfuric acid monoesters of ethoxylated alcohols (EO degree: 4 to 30, alkyl: $C_{12}$ to $C_{18}$) and of ethoxylated alkylphenols (EO degree: 3 to 50, alkyl: $C_4$ to $C_9$), of alkylsulfonic acids (alkyl: $C_{12}$ to $C_{18}$) and of alkylarylsulfonic acids (alkyl: $C_9$ to $C_{18}$). Other suitable surfactants are given in Houben-Weyl, Methoden der organischen Chemie, Volume XIV/1, Makromolekulare Stoffe [Macromolecular substances], Georg-Thieme Verlag, Stuttgart, 1961, pages 192 to 208. In place of or as a mixture with conventional surfactants it is also possible, however, to employ conventional protective colloids, such as polyvinyl alcohol and polyvinylpyrrolidone, for co-stabilization. In general, the amounts of conventional dispersants used, based on the monomers to be polymerized, will not exceed 3 or 2% by weight.

Suitable free-radically polymerizable monomers for the free-radical aqueous emulsion polymerization technique are, in particular, monoethylenically unsaturated monomers such as olefins, for example ethylene, vinyl-aromatic monomers, such as styrene, α-methylstyrene, o-chlorostyrene or vinyltoluenes, vinyl halides and vinylidene halides, such as vinyl chloride and vinylidene chloride, esters of vinyl alcohol with $C_1$ to $C_{18}$ monocarboxylic acids, such as vinyl acetate, propionate, n-butyrate, laurate and stearate, esters of preferably $C_3$–$C_6$ α,β-monoethylenically unsaturated mono- and dicarboxylic acids, especially acrylic, methacrylic, maleic, fumaric and itaconic acid, with generally $C_1$–$C_{12}$-, preferably $C_1$ to $C_8$- and, in particular, $C_1$ to $C_4$-alkanols, such as, in particular, methyl, ethyl, n-butyl, isobutyl and 2-ethylhexyl acrylates and methacrylates, dimethyl maleate or n-butyl maleate, nitriles of α,β-monoethylenically unsaturated carboxylic acids, such as acrylonitrile, and also $C_{4-8}$ conjugated dienes, such as 1,3-butadiene and isoprene. These monomers generally constitute the principal monomers which, based on the total amount of monomers to be polymerized by the novel process of free-radical aqueous emulsion polymerization, normally make up a proportion of more than 50% by weight. Monomers which when polymerized alone usually form homopolymers of enhanced solubility in water are normally included only as modifying monomers in amounts, based on the total amount of monomers to be polymerized, of less than 50% by weight, generally from 0.5 to 20% by weight, preferably from 1 to 10% by weight.

Examples of such monomers are $C_3$–$C_6$ α,β-monoethylenically unsaturated mono- and dicarboxylic acids and their amides, for example acrylic, methacrylic, maleic, fumaric and itaconic acids, acrylamide and methacrylamide, and also vinylsulfonic acid and the water-soluble salts thereof, and also N-vinylpyrrolidone. Monomers which normally enhance the internal strength of the films formed from the aqueous polymer dispersion are generally included in polymerization likewise only in minor amounts, usually from 0.5 to 10% by weight based on the total amount of the monomers to be polymerized. Such monomers normally contain an epoxy, hydroxyl, N-methylol or carbonyl bond or at least two nonconjugated ethylenically unsaturated double bonds. Examples thereof are N-alkylolamides of $C_3$–$C_{10}$ α,β-monoethylenically unsaturated carboxylic acids and also their esters with $C_1$–$C_4$ alcohols, among which N-methylolacrylamide and N-methylolmethacrylamide are especially preferred, silanized monomers, such as vinyltrimethoxysilane, monomers with two vinyls, monomers with two vinylidenes, and monomers with two alkenyls. Of particular suitability in this context are the diesters of dihydric alcohols with α,β-monoethylenically unsaturated monocarboxylic acids, among which, in turn, acrylic and methacrylic acid are employed with preference. Examples of such monomers containing two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and also propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. Of particular importance in this context are, in addition, the $C_1$–$C_8$-hydroxyalkyl esters of acrylic and methacrylic acid, such as n-hydroxyethyl, n-hydroxypropyl and n-hydroxybutyl acrylate and methacrylate, and also compounds such as diacetoneacrylamide and acetylacetoxyethyl acrylate and methacrylate. In addition to monomers containing unsaturated double bonds it is also possible for minor amounts, normally from 0.01 to 2% by weight based on the monomers to be polymerized, of substances which regulate the molecular weight to be included in polymerization, such as tert-dodecyl mercaptan and 3-mercaptopropyltrimethoxysilane. Such substances are preferably added to the polymerization zone as a mixture with the monomers to be polymerized.

In particular it is possible by the novel process to prepare polymer dispersions by polymerizing—using the method of free-radical aqueous emulsion polymerization—those monomer mixtures composed of from 70 to 100% by weight of esters of acrylic and/or methacrylic acid with $C_1$–$C_{12}$-alkanols and/or styrene, or from 70 to 100% by weight of vinyl chloride and/or vinylidene chloride, or from 70 to 100% by weight of styrene and/or butadiene, or from 40 to 100% by weight of vinyl acetate, vinyl propionate and/or ethylene, the acrylate mixtures embracing in particular the following monomer compositions:

from 70 to 99% by weight of at least one ester of acrylic and/or methacrylic acid with $C_1$–$C_8$-alkanols, from 1 to 5% by weight of at least one monomer from the group consisting of acrylic acid, methacrylic acid and the $K^\oplus$, $Na^\oplus$ and ammonium salts of these acids, from 0 to 25% by weight of vinyl acetate or styrene or a mixture thereof.

It is notable that the aqueous polymer dispersions which result are suitable not only as binders (for example paper-coating slips, interior paints, fiber mats) but also as adhesives or additives in mineral-setting compositions, for example cementitious compositions.

The novel free-radical aqueous emulsion polymerization process is of course normally carried out under inert gas and with stirring. In general, the amount of amphiphilic block copolymer added in accordance with the invention is from 0.1 to 15% by weight, preferably from 0.5 to 6% by weight, based on the monomers to be polymerized.

In conclusion it should be stated that the concentration of the solids in the aqueous polymer dispersions that are obtainable can be from 10 to 70% by volume or from 25 to 70% by volume, or from 35 to 70% by volume or from 45 to 70% by volume. The resulting number-average polymer particle diameter can be from 10 to 2000 nm, from 50 to 1500 nm, from 100 to 1000 nm, from 200 to 750 nm or from 300 to 500 nm.

It should also be stated that aqueous polymer dispersions which are obtainable can in many cases be dried in a simple manner without additional auxiliaries so as to form redispersable polymer powders (for example by freeze drying or spray drying).

In addition to the abovementioned block copolymers and amphiphilic block copolymers, the novel process can also be used to prepare polymers E which are suitable as dispersing resins and are obtainable by reacting F. a polymer F, obtainable by reacting at least one compound III from the group consisting of
   a) an ester IV of
      a1) an α,β-unsaturated carboxylic acid V and
      a2) an alkyl alcohol VI of 1 to 25 carbons,
   b) an ester VII of
      b1) vinyl alcohol and
      b2) a saturated carboxylic acid VIII of 1 to 4 carbons,
   c) vinyl chloride,
   d) styrene or vinylbenzenes carrying an alkyl group of 1 to 4 carbons on the benzene ring, in the presence of a free radical I or a compound II or mixtures thereof with an electron donor and/or an N-oxyl radical, with G. at least one compound X of
   a) from 50 to 100% by weight, based on X, of at least one compound XI from the group consisting of
      a1) an ester XII of
          a) an α,β-unsaturated carboxylic acid XIII and
          b) an alkyl alcohol XIV of 2 to 10 carbons which carries at least one polar or acidic group,
      a2) an amide XV of
          a) an α,β-unsaturated carboxylic acid XVI and
          b) ammonia or an amine XVII of 2 to 10 carbons which carries at least one polar or acidic group,
      a3) N-vinyl compounds XVIII,
      a4) styrenesulfonic acid or a vinylbenzenesulfonic acid which carries on the ring an alkyl group of 1 to 4 carbons, and
   b) from 0 to 50% by weight, based on X, of at least one compound XIX from the group consisting of
      b1) an ester XX of
          a) an α,β-unsaturated carboxylic acid XXI and
          b) an alkyl alcohol XXII of 1 to 25 carbons,
      b2) an ester XXIII of
          a) vinyl alcohol and
          b) a saturated carboxylic acid XXIV of 1 to 4 carbons,
      b3) vinyl chloride,
      b4) styrene or vinylbenzenes which carry on the benzene ring an alkyl group of 1 to 4 carbons, in the presence of a free radical I or a compound II or mixtures thereof with an electron donor and/or an N-oxyl radical, the proportion by weight of F in the polymer EI being from 10 to 90% by weight and the proportion by weight of the total amount of X being from 10 to 90% by weight of the polymer E.

Suitable esters IV are primarily esters of α,β-unsaturated caroxylic acids V of the formula

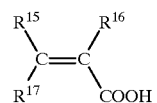

where $R^{15}$, $R^{16}$ and $R^{17}$ are hydrogen or $C_1$–$C_4$-alkyl, preference being given to acrylic and methacrylic acid. Mixtures of esters of various such carboxylic acids, may also be employed.

Suitable alcohol components VI other than the $C_8$–$C_{25}$ alcohols such as 2-ethylhexanol, nonanol, stearyl alcohol and lauryl alcohol are preferably the $C_1$–$C_7$ alcohols, especially methanol, ethanol, n-propanol, isopropanol, n-butanol, sec-butanol, t-butanol, isobutanol, t-butan-1-ol and also mixtures of such alcohols.

Suitable esters VII are esters of vinyl alcohol and a saturated carboxylic acid of 1 to 4 carbons, such as formic, butyric and isopropylcarboxylic acid, especially acetic and propionic acid.

It is also possible to use mixtures of esters of various such carboxylic acids.

Likewise suitable as compound III are olefinically unsaturated compounds, such as vinyl chloride, styrene, vinylbenzenes carrying on the benzene ring an alkyl of 1 to 4 carbons, such as 4-ethylstyrene. The polymers F may be composed of one compound III or of two or more compounds III.

The polymers F can be isolated from the reaction mixture by known methods, for example by precipitation or extraction, or can be used without isolation for further processing.

The polymers F should advantageously have a weight-average molecular weight of more than 1000, preferably from 3000 to 30,000, and a quotient of the weight-average molecular weight to the number-average molecular weight (polydispersity) of less than 3, preferably less than 2.

Suitable esters XII are primarily esters of $\alpha,\beta$-unsaturated carboxylic acids XIII of the formula

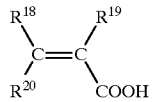

where $R^{18}$, $R^{19}$ and $R^{20}$ are hydrogen or $C_1$–$C_4$-alkyl, preference being given to acrylic and methacrylic acid. Mixtures of esters of various such carboxylic acids can also be employed.

Suitable alcohol components XIV are diols, such as 1,2-ethanediol, 1,3-propanediol, 1,4-butanediol, alcohols with polar substituents, such as N,N-dimethylaminoethanol and ethylene glycol monoethyl ether, alcohols which carry acidic groups, such as 2-sulfoethanol (isethionic acid) and 3-sulfopropanol, and also mixtures of such alcohols.

Suitable amides XV are primarily amides of $\alpha,\beta$-unsaturated carboxylic acids XVI of the formula

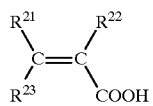

where $R^{21}$, $R^{22}$ and $R^{23}$ are hydrogen or $C_1$–$C_4$-alkyl, preference being given to acrylic and methacrylic acid. Mixtures of amides of various such carboxylic acids can also be employed.

Suitable amine components are ammonia and amines XVII which carry at least one polar group, one acidic group or one group which can readily be converted to an acidic group, such as salts, for instance 2-methyl-2-aminopropanesulfonic acid, 2-aminoethanesulfonic acid and 3-aminopropanesulfonic acid and salts thereof, preferably metal salts, and also mixtures of such amine components.

Suitable polar groups are primarily OH, tertiary amino and sulfone groups, and particularly suitable acidic groups are sulfo, phosphono and the phosphoric acid group, and especially carboxyl.

Groups which are readily converted to acidic groups are, for example, the ester group or salts, preferably of the alkali metals such as sodium or potassium.

Other suitable compounds XI are N-vinyl compounds XVIII, such as N-vinylformamide, N-vinylpyrrolidone, N-vinylcaprolactam, N-vinylimidazole, vinylbenzenesulfonic acids and vinylbenzenesulfonic acids which carry on the benzene ring an alkyl, in particular of 1 to 4 carbons, and also mixtures of such compounds. The polymers I may include one compound XI or two or more compounds XI.

Suitable esters XX are primarily esters of $\alpha,\beta$-unsaturated carboxylic acids XXI of the formula

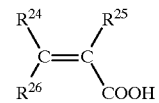

where $R^{24}$, $R^{25}$ and $R^{26}$ are hydrogen or $C_1$–$C_4$-alkyl, preference being given to acrylic and methacrylic acid. Mixtures of esters of various such carboxylic acids can also be employed.

Suitable alcohol components XXII are, in addition to the $C_8$–$C_{25}$ alcohols such as 2-ethylhexanol, nonanol, stearyl alcohol and lauryl alcohol, preferably the $C_1$–$C_7$ alcohols, especially methanol, ethanol, n-propanol, isopropanol, n-butanol, sec-butanol, tert-butanol, isobutanol, tert-butan-1-ol and also mixtures of such alcohols.

Suitable esters XXIII are esters of vinyl alcohol and a saturated carboxylic acid of 1 to 4 carbons such as formic, butyric and isopropylcarboxylic acid, especially acetic and propionic acid. It is also possible to employ mixtures of esters of various such carboxylic acids.

Likewise suitable as compound XIX are olefinically unsaturated compounds such as vinyl chloride, styrene and vinylbenzenes which carry on the benzene ring an alkyl of 1 to 4 carbons, such as 4-ethylstyrene, and also mixtures of such compounds.

The proportion by weight of the compound X, based on the polymers E, should be from 10 to 90% by weight, the proportion by weight of the polymers F, based on the polymers E, should be from 10 to 90% by weight, and the proportion by weight of the compound XI, based on the compound X, should be from 50 to 100% by weight; furthermore, the proportion by weight of the compound XIX, relative to the compound X, should be from 0 to 50% by weight.

Particularly suitable initiators are those having a half life of 1 hour at from 60 to 90° C. and a half life of 10 hours at from 50 to 80° C. When initiators of longer half life are used, promoters such as tertiary amines may advantageously be employed.

The molar ratio of the compound XXV to the initiator should be from 0.5 to 5, preferably from 0.8 to 4.

The polymers can be isolated from the reaction mixture by known methods, for example by precipitation or extraction, or can be used for further processing without being isolated.

The polymers E advantageously have a weight-average molecular weight of more than 2000, preferably from 3000 to 50,000, and a quotient of weight-average molecular weight to number-average molecular weight (polydispersity) of less than 3, preferably less than 2.

The polymers E generally contain radicals derived from the free radicals I or $R^5$. In some cases these radicals can be exchanged for oxyamine groups.

Particularly suitable polymers E comprise a mixture of from 40 to 60% by weight, preferably from 45 to 55% by weight, of butyl acrylate and from 40 to 60% by weight, preferably from 45 to 55% by weight, of methyl acrylate with a monomer number of from 20 to 30, preferably 24, 25 or 26, as compound III, and 2-acryl-amido-2-methylpropanesulfonic acid with a monomer number Pn of from 3 to 7, preferably 4, 5 or 6 as compound X, for example polymers E comprising a mixture of 50% by weight of butyl acrylate and 50% by weight of methyl acrylate with a monomer number of 25 as compound III and 2-acrylamido-2-methylpropanesulfonic acid with a monomer number Pn of 5 as compound X.

In accordance with their stepwise preparation, the novel polymers E consist of an organophilic polymeric chain moiety (polymer F) and a hydrophilic chain moiety which carries acidic or polar groups. These acidic or polar groups have a strong affinity for many pigments, especially inorganic oxide pigments, and therefore accumulate on the surface thereof. Consequently, pigment preparations having an organophilic shell are obtained from the pigments and the polymers E by customary intensive mixing.

To prepare the pigment preparations, the pigments—especially colored pigments—are mixed with the polymers E and, if desired, with additives in the absence of a solvent or, preferably, in the presence of an organic diluent, in a manner known per se. Suitable diluents are hydrocarbons, especially toluene and cyclohexane, ketones, especially methyl ethyl ketone and cyclohexanone, esters, especially ethyl acetate, and ethers, especially tetrahydrofuran or dioxane. In some cases water is also suitable. The pigment preparation may be isolated from the mixture by removing the diluent or can, preferably, be employed for further processing without being isolated.

The pigment preparations can be incorporated into organic binders conveniently and without unwanted agglomeration.

To this end the pigment preparations can be mixed in a manner known per se with a binder and, if desired, with additives in the absence of a solvent or, preferably, in the presence of an organic diluent. Suitable organic diluents are hydrocarbons, especially toluene, cyclohexane and n-alkanes, ketones, especially methyl ethyl ketone, cyclohexanone and methyl isobutyl ketone, esters, especially ethyl acetate, and ethers, especially tetrahydrofuran and dioxane.

Suitable binders are, customarily, polyurethanes, polyacrylates, polymethacrylates, polyacrylamide, vinyl polymers such as polystyrene, polyvinyl chloride, polyvinyl acetate, polyvinyl propionate and polyacrylonitrile, cellulose-containing binders, such as cellulose esters, especially cellulose nitrates, cellulose acetates, cellulose acetopropionate and cellulose acetobutyrate, phenoxy resins and epoxy resins.

Additives employed are, customarily, fillers such as inorganic and organic pigments, eg. alumina, silica, titanium dioxide, carbon black, polyethylene, polypropylene, chalking inhibitors, eg. antimony oxide, and thixotropic substances, eg. amorphous silicic acid.

The mixtures of pigment preparation, binder and, if used, additives or solvents are used in a conventional manner as coating compositions.

The coating compositions may include the pigment preparations alone or as a mixture with other pigments or pigment preparations.

A particular feature of the novel process is its economic efficiency, since the reaction takes place at a sufficient rate at industrially advantageous temperatures and also lends itself well to control. Both polar and nonpolar monomers can be employed. The novel process is substantially insensitive to small amounts of moisture, and it is also possible to react mixtures of monomers to form random copolymers. The resulting polymers have a PDI of less than 2 and can have a high molecular weight.

EXAMPLES

Styrene (S) was purified over alumina and distilled over calcium hydride. Methyl methacrylate (MMA) was distilled over calcium hydride. Toluene was distilled over sodium. Azoisobutyronitrile (AIBN) was recrystallized from ether. Commercially available benzoyl peroxide (BPO) (as a 25% strength by weight solution in water) was employed without further purification. 2,5 Dihydro-1,2,5,5-tetraphenyl-1H-1,2,4-triazol-2-yl was prepared in accordance with Tetrahedron 51(47), 1995, 12883–12898 by dehydrogenating the corresponding 4,5-dihydro-1H-1,2,4-triazole.

Examples 1 to 7

The experiments were conducted under inert gas (argon). The amounts of styrene or methyl methacrylate indicated in the table were charged to the reaction vessel and cooled to 25° C., and the amounts of AIBN or BPO and 2,5-dihydro-1,3,5,5-tetraphenyl-1H-1,2,4-triazol-2-yl indicated in the table were added. The reaction mixture was then brought to the reaction temperature. At fixed intervals, 1 ml samples were taken. These were diluted with tetrahydrofuran and precipitated in methanol. The degree of conversion was determined by gas chromatography and the molecular weights by gel permeation chromatography (polystyrene calibration).

Comparison Examples V1 to V2

The experiments were conducted as described for Examples 1 to 7 but without the addition of 2,5-dihydro-1,3,5,5-tetraphenyl-1H-1,2,4-triazol-2-yl.

The reaction conditions and results are given in the table.

TABLE

Polymerization of styrene or methyl methacrylate

| Ex. No. | Triazolyl [mmol] | Free-radical initiator Type | Quantity [mmol] | Monomer Type | Quantity [mmol] | Reaction temp. [°C.] | time [h] | Conversion [%] | $M_w$ × $10^{-3}$ | PDI |
|---|---|---|---|---|---|---|---|---|---|---|
| 1 | 0.21 | AIBN | 0.12 | S | 105.5 | 120 | 0.25 | 14 | 18.7 | 1.85 |
|   |   |   |   |   |   |   | 0.5 | 15 | 8.2 | 1.81 |

TABLE-continued

Polymerization of styrene or methyl methacrylate

| Ex. No. | Triazolyl [mmol] | Free-radical initiator Type | Quantity [mmol] | Monomer Type | Quantity [mmol] | Reaction temp. [°C.] | time [h] | Conversion [%] | $M_w \times 10^{-3}$ | PDI |
|---|---|---|---|---|---|---|---|---|---|---|
|  |  |  |  |  |  |  | 1.0 | 20 | 21.0 | 1.71 |
|  |  |  |  |  |  |  | 1.5 | 23 | 23.7 | 1.67 |
|  |  |  |  |  |  |  | 2.5 | 27 | 25.7 | 1.71 |
|  |  |  |  |  |  |  | 4.0 | 34 | 38.2 | 1.71 |
|  |  |  |  |  |  |  | 6.0 | 50 | 42.6 | 1.70 |
| 2 | 0.21 | AIBN | 0.12 | S | 88.4 | 120 | 1 | 21 | 30.6 | 1.93 |
|  |  |  |  |  |  |  | 4 | 37 | 51.6 | 1.77 |
|  |  |  |  |  |  |  | 6 | 40 | 56.8 | 1.88 |
| 3 | 0.16 | AIBN | 0.12 | S | 94.5 | 120 | 0.25 | 16 | 26.5 | 2.01 |
|  |  |  |  |  |  |  | 1 | 25 | 43.1 | 2.01 |
|  |  |  |  |  |  |  | 2 | 38 | 60.3 | 1.92 |
|  |  |  |  |  |  |  | 3 | 56 | 72.6 | 1.87 |
| 4 | 0.16 | BPO | 0.12 | S | 96.4 | 120 | 0.25 | 16 | 40.0 | 2.13 |
|  |  |  |  |  |  |  | 0.75 | 25 | 42.0 | 1.98 |
|  |  |  |  |  |  |  | 1.0 | 27 | 44.0 | 1.95 |
|  |  |  |  |  |  |  | 1.5 | 35 | 48.6 | 1.87 |
|  |  |  |  |  |  |  | 2.0 | 39 | 54.4 | 1.76 |
|  |  |  |  |  |  |  | 2.5 | 43 | 56.0 | 1.73 |
|  |  |  |  |  |  |  | 3.5 | 70 | 82.6 | 1.65 |
| 5 | 0.16 | BPO | 0.12 | MMA | 101.1 | 70 | 0.5 | 12 | 41.4 | 1.38 |
|  |  |  |  |  |  |  | 1.0 | 20 | 46.4 | 1.53 |
|  |  |  |  |  |  |  | 2.0 | 23 | 55.7 | 1.56 |
|  |  |  |  |  |  |  | 3.0 | 35 | 58.8 | 1.51 |
|  |  |  |  |  |  |  | 5.0 | 36 | 59.2 | 1.58 |
| 6 | 0.16 | BPO | 0.12 | MMA | 102.6 | 65 | 0.5 | 8 | 37.0 | 1.33 |
|  |  |  |  |  |  |  | 1.0 | 13 | 50.0 | 1.47 |
|  |  |  |  |  |  |  | 2.0 | 20 | 69.9 | 1.65 |
|  |  |  |  |  |  |  | 3.0 | 26 | 81.7 | 1.66 |
|  |  |  |  |  |  |  | 5.0 | 35 | 90.3 | 1.61 |
| 7 | 0.16 | BPO | 0.12 | MMA | 101.1 | 65 | 0.25 | 5 | 28.1 | 1.30 |
|  |  |  |  |  |  |  | 0.5 | 8 | 36.2 | 1.33 |
|  |  |  |  |  |  |  | 1.0 | 13 | 55.7 | 1.47 |
|  |  |  |  |  |  |  | 2.0 | 20 | 82.7 | 1.65 |
|  |  |  |  |  |  |  | 2.5 | 24 | 88.1 | 1.68 |
|  |  |  |  |  |  |  | 3.0 | 26 | 89.5 | 1.66 |
|  |  |  |  |  |  |  | 4.0 | 31 | 98.6 | 1.73 |
|  |  |  |  |  |  |  | 5.5 | 35 | 94.7 | 1.61 |
| V1 | — | AIBN | 0.12 | S | 86.4 | 120 | 0.25 | 20 | 68.2 | 2.97[b] |
|  |  |  |  |  |  |  | 1 | 40 | 128.2 | 3.27[b] |
| V2 | — | BPO | 0.12 | MMA | 100.9 | 65 | 3 | 60 | 380.1 | 2.93 |

[b]bimodal

We claim:

1. A process for preparing a polymer from monomers in a free-radical polymerization reaction by i) initiating the free-radical polymerization of the monomers, ii) propagating the free-radical polymerization of the monomers, and iii) terminating the free-radical polymerization of the monomers to obtain the polymer, wherein the polymerization of the monomers is propagated in the presence of free radicals (I) of formula ($I_1$), ($I_3$) or ($I_4$)

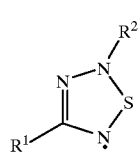
($I_1$)

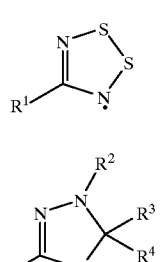
($I_3$)

($I_4$)

wherein
$R^1$, $R^2$, $R^3$ and $R^4$ are identical or different and independently are hydrogen, $C_1$–$C_{20}$-alkyl or $C_6$–$C_{18}$-aryl.

2. The process of claim 1, wherein the radicals (I) are of formula ($I_4$).

3. The process of claim 2, wherein $R^1$ is phenyl, $R^2$ is phenyl or methyl and $R^3$ and $R^4$ are each phenyl, biphenyl-2,2'-diyl, 6,6'-dimethylbipheny-2,2'-diyl or 5,5'-dimethylbipheny-2,2'-diyl.

4. The process of claim 2, wherein formula (I₄) represents a 2,5-dihydro-1H-1,2,4-triazolyl radical.

5. The process of claim 1, wherein the polymerization of the monomers is initiated by a conventional free-radical initiator.

6. The process of claim 1, wherein the polymerization of the monomers is initiated by thermally or photochemically cleaving a compound of formula II

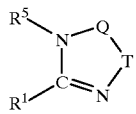
(II)

wherein
Q—T represents the N(R²)—S moiety of formula (I₁), the S—S moiety of formula (I₃) and the N(R²)—C(R³)(R⁴) moiety of formula (I₄), and R⁵ is a moiety which, upon thermal or photochemical cleavage of the compound of formula II, forms a radical capable of initiating the polymerization of the monomers.

7. The process of claim 6, wherein R⁵ is an optionally substituted alkyl group, an optionally substituted aryl group or a moiety which corresponds to a radical which is formed upon cleavage of a conventional free-radical initiator.

8. The process of claim 7, wherein R⁵ is optionally substituted C₁–C₁₀-alkyl, optionally substituted C₆–C₁₈-aryl, or a moiety which corresponds to a radical which is formed upon cleavage of azobisisobutyronitrile or benzoylperoxide.

9. The process of claim 1, which comprises
   a) polymerizing one or more monomers selected from the group consisting of styrene, α-methylstyrene, acrylonitrile, methacrylonitrile, methyl methacrylate and maleic anhydride to form a first polymer comprising one or more blocks A having a glass transition temperature $T_g$ of greater than 0° C., and
   b) subsequently polymerizing the first polymer with one or more monomers selected from the group consisting of n-butyl acrylate, methyl acrylate and 2-ethylhexyl acrylate to form a block copolymer comprising, in addition to the one or more blocks A of the first polymer, one or more blocks B having a glass transition temperature $T_g$ of less than 0° C.

10. The process of claim 1, which comprises
    a) polymerizing, in the presence of free radicals of formula I, one or more hydrophobic monomers C selected from the group consisting of styrene, methyl methacrylate, n-butyl acrylate, n-dodecyl acrylate, 2-ethylhexyl acrylate, dihydrodicyclopentadienyl acrylate and vinyl dodecyl ether, to form a first polymer comprising one or more polymer blocks of a type C, and
    b) subsequently polymerizing the first polymer, in the presence of free radicals of formula I, with one or more hydrophilic monomers, or monomers which can be hydrolyzed to hydrophilic monomers, selected from the group consisting of acrylic acid, methacrylic acid, 2-acrylamido-2-methylpropanesulfonic acid, styrenesulfonic acid, the potassium, sodium and ammonium salts of these acids, methyl acrylate, t-butyl acrylate, t-butyl methacrylate, ω-hydroxy-C₂–C₄-alkylacrylate, ω-hydroxy-C₂–C₄-alkyl methacrylate, vinylpyrrolidone, vinylimidazole, vinylcaprolactam, vinylformamide, N-methylvinylimidazole, vinyl methyl ether and dimethylaminoethyl acrylate, to form a block copolymer comprising, in addition to the one or more blocks of type C of the first polymer, one or more polymer blocks of type D,
    to give an amphiphilic block copolymer which is soluble in water at 20° C. and 1 atm, or a block copolymer which can be converted into the amphiphilic block copolymer by selective hydrolysis, wherein the polymer blocks of types C and D are connected to one another directly and not via constituent units which are not part of the blocks of types C and D.

11. The process of claim 1, which comprises polymerizing, in the presence of free radicals of formula I, at least one monomer selected from the group consisting of
    a) an ester of an α,β-unsaturated carboxylic acid and an alkyl alcohol having 1 to 25 carbons,
    b) an ester of vinyl alcohol and a saturated carboxylic acid having 1 to 4 carbons,
    c) vinyl chloride, and
    d) styrene or vinylbenzenes carrying an alkyl group having 1 to 4 carbons on the benzene ring,
to give at least one polymer F, and
copolymerizing, in the presence of free radicals of formula I, at least one of the polymers F with at least one compound X consisting of
    a) from 50 to 100% by weight, based on X, of at least one monomer selected from the group consisting of
        a₁) an ester of an α,β-unsaturated carboxylic acid and an alkyl alcohol having 2 to 10 carbons, and carrying at least one polar group,
        a₂) an amide of an α,β-unsaturated carboxylic acid and ammonia or an amine having 2 to 10 carbons, and carrying at least one polar or acidic group,
        a₃) an N-vinyl compound,
        a₄) styrenesulfonic acid or a vinylbenzenesulfonic acid which carries on the ring an alkyl group having 1 to 4 carbons, and
    b) from 0 to 50% by weight, based on X, of at least one compound selected from the group consisting of
        b₁) an ester of an α,β-unsaturated carboxylic acid and an alkyl alcohol having 1 to 25 carbons,
        b₂) an ester of vinyl alcohol and a saturated carboxylic acid having 1 to 4 carbons,
        b₃) vinyl chloride,
        b₄) styrene acid or vinylbenzenes which carry one the benzene ring an alkyl group having 1 to 4 carbons,
to give a polymer E, wherein the proportion of F is from 10 to 90% by weight, based on the polymer E, and the proportion of the total amount of X is from 10 to 90% by weight, based on the polymer E.

* * * * *